United States Patent [19]
Winkelbauer et al.

[11] Patent Number: 4,528,244
[45] Date of Patent: Jul. 9, 1985

[54] FUSED SILICA SHAPES

[75] Inventors: Howard M. Winkelbauer, West Mifflin; Ke-Chin Wang, Pittsburgh, both of Pa.

[73] Assignee: Dresser Industries, Inc., Dallas, Tex.

[21] Appl. No.: 537,921

[22] Filed: Sep. 30, 1983

[51] Int. Cl.³ .............................................. B32B 9/04
[52] U.S. Cl. .................................. 428/446; 106/38.9; 428/698; 428/702
[58] Field of Search ................... 106/38.3, 38.9, 38.27; 428/446, 698, 702

[56] References Cited

U.S. PATENT DOCUMENTS 4,303,181 12/1981 Lewis et al. ......................... 428/702
4,406,670 9/1983 Sarin ..................................... 428/698

Primary Examiner—Lorenzo B. Hayes
Attorney, Agent, or Firm—Barry E. Deutsch

[57] ABSTRACT

Fused silica shapes having a coating of sialon on the surfaces thereof.

6 Claims, 1 Drawing Figure

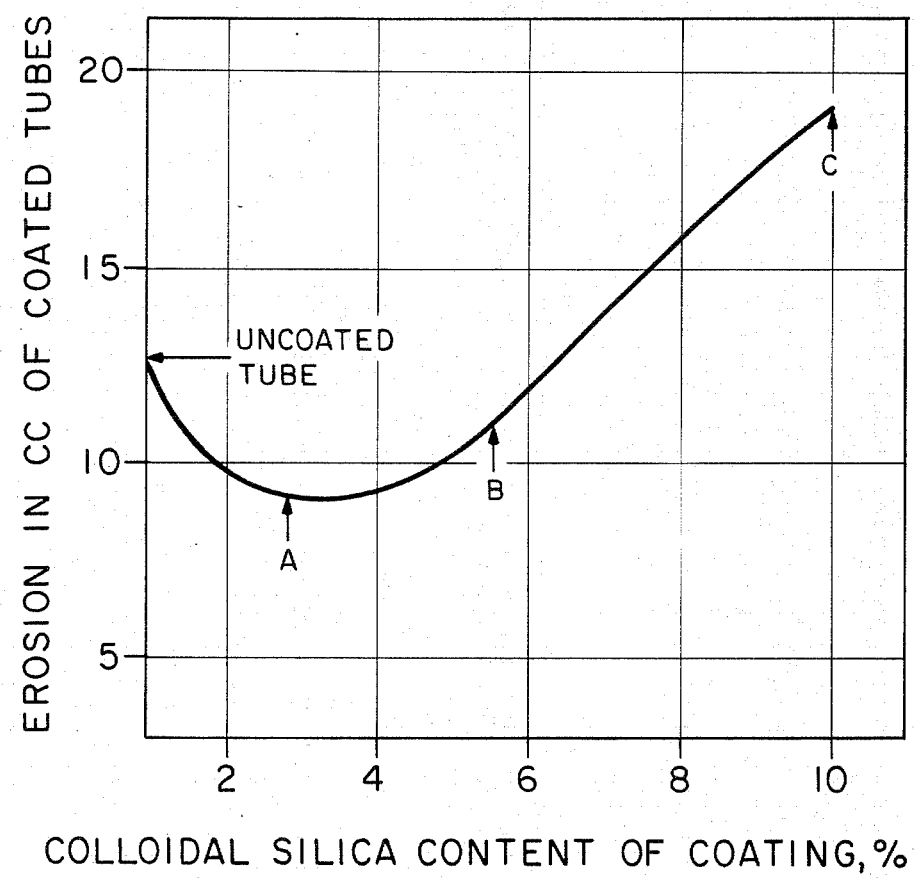

FUSED SILICA SHAPES

Continuous casting is generally defined as the making of a casting many times the length of the mold in which it is produced. Molten steel is poured into an open bottom mold of the desired product shape. The steel is cooled in the mold just enough to harden the exterior surface of the casting, which forms a shell or container to hold the balance of the liquid metal. The partially solidified casting is then continuously withdrawn from the bottom of the mold, where it is further cooled by water sprays until all the metal is solidified.

Preparing liquid metal for pouring and handling hot bars presents no serious problems. The secret of success and wherein the problems arise is in handling the metal from the time it is poured from the ladle until it leaves the mold.

Fused silica shapes are used in many applications where the main factor limiting their usefulness is their inability to resist corrosive slags and molten metals. Fused silica shroud tubes used in continuous casting have excellent thermal shock resistance. They show little effect during sudden thermal surges from room temperature to steel pouring temperatures, but they are slowly dissolved by the corrosive mold powder which floats on the molten steel and protects the steel from oxidation and gas absorption. In addition, strong reducing elements in molten steel, such as manganese, slowly erode the fused silica tube by reducing silica to liquid silicon. In addition, fused silica shapes are used in a series by tubing and float on top of the molten copper. As the metal line rises and falls, the line of floats trips levers which regulate the rate of pouring into molds. These fused silica floats are relatively inert to molten copper, but are slowly dissolved by a layer of copper oxides which film the surface of the metal.

Many refractory coatings have been attempted to protect fused silica and other refractory compositions from the corrosive action of slags and metals. These coatings, however, have met with little success, mainly because of two reasons. First, most coating materials have a much higher thermal expansion than fused silica and subsequently, peel off from their substrate when exposed to thermal cycling. Secondly, most coatings are porous and only slightly diffuse into fused silica. This permits molten slags and metals to quickly penetrate through the coating and dissolve the coating-fused silica interface. Once this interface is dissolved, the coating simply falls away.

Accordingly, it is among the objects of the invention to provide a coating on fused silica shapes that does not peel or separate during severe thermal cycling and imparts improved corrosion resistance.

Silicon nitride, aluminum nitride and aluminum oxide in the form of fine powders when thoroughly and uniformly mixed in suitable proportions, and heated at elevated temperatures, can provide coatings which have relatively good high temperature properties and application in excess of 1400° C. Nitride compounds referred to as sialon compounds have been synthesized by mixing alpha and/or beta silicon nitride with alpha and/or gamma alumina powder. Sialon generally means an intimate dispersion of alumina oxide throughout a silicon nitride matrix. It is believed that upon sintering, the material becomes a solid solution of aluminum oxide in silicon nitride. The letters which make up the term "sialon" are the letters taken from the chemical abbreviation for the elements therein, that is, silicon, aluminum, oxygen and nitrogen.

Considerable effort has been directed to the development of ceramic articles containing 80% and more of silicon nitride, silicon oxynitride and/or sialon. These articles consist predominantly of single phase nitrides and display good thermal shock resistance, strength and corrosion resistance. Little information exists in the utilization of these nitride phases as the bonding agent in conventional refractories. Several limiting factors which have retarded large scale development of nitride bonded refractories include the high cost of purchased silicon nitride, the instability of certain oxynitrides at high temperature, and the hydrolizing tendency of possible starting materials, such as, aluminum nitride and magnesium nitride. To overcome these obstacles, it would be advantageous to form, in situ, nitride phases by the addition of a single metallic metal powder which can react with gaseous nitrogen to produce a crystalline nitride phase capable of ceramic bonding to relatively inexpensive refractory grains. This approach will greatly lower the cost of nitride articles and couple the distinct advantages of nitride compounds to the established advantages of conventional refractory grains.

In accordance with the present invention, there is provided fused silica shapes having a coating of sialon thereupon. It is believed that a sialon coating on fused silica is immune to rapid thermal changes because of the similar thermal expansion coefficients and thermal conductivities of sialon and fused silica. In addition, sialon and fused silica form a strong interface during firing due to solid state incorporation of sialon into silica. This migration of one phase into another produces a thick diffused interface zone. Because of the stabilizing effect of nitrogen, sialon is known to have much greater resistance to molten metals than fused silica. Coating of fused silica with sialon produces, therefore, an exterior surface that is difficult to erode or corrode.

Sialon grain is prepared by shaping a mixture of silicon and alumina powders and then subjecting the shapes to a nitriding atmosphere. The shapes are then crushed to a fine powder and blended with colloidal silica and water to provide a slip. The slip is then applied to a preformed fused silica shape, dried and fired to 1800° F.

Fused silica is an amorphous form of silica that is produced by heating a silica raw material to a temperature above the equilibrium melting point of silica (3140° F.) which is the melting point of the high temperature stable form of silica, cristobalite. After the silica becomes liquid, it is rapidly cooled to avoid recrystallization.

In the drawing, there is shown test results of fused silica shroud tubes coated with compositions A, B and C of Table I tested at 2800° F. under reducing conditions.

TABLE I

| Fused Silica Tubes Coated with Sialon | | | |
|---|---|---|---|
| Coating Composition: | A | B | C |
| Sialon Powder, 70% −325 mesh(min.) | 88.9% | 82.7% | 70.2% |
| Dispersant | 4.8 | 4.8 | 4.8 |
| Colloidal Silica | 6.3 | 12.5 | 25.0 |
| (Colloidal Silica Content) | (2.5) | (5.0) | (10.0) |
| Plus Additions: Water, %: | 25.0 | 15.0 | 10.0 |
| Slip Consistency: | Good | Good | Good |

TABLE I-continued

| Fused Silica Tubes Coated with Sialon | | | |
|---|---|---|---|
| Coating Composition: | A | B | C |
| Adherence of Coating After 1800° F. Reheat: | Good | Good | Good |
| Spalling Test Results (on Coated Tubes with Compositions), 2800° F., Quenched in Water: | | | |
| 1st Cycle: | Coating Intact | Coating Intact | Coating Intact |
| 2nd Cycle: | Coating Intact | Coating Intact | Coating Intact |
| 3rd Cycle: | Tube Shattered, but Coating Tightly Adhering | Coating Intact | Tube Shattered, but Coating Intact |
| 4th Cycle: | — | Tube Cracked, but Coating Intact | — |

As shown in FIG. 1, good slag resistance is attained by using colloidal silica as the vehicle in amounts near 2.5% of the sialon powder. Colloidal silica acts as a binder which provides adhesion between the sialon particles and it facilitates bonding between the particles and the substrate. Sialon is first wet milled to a powder having at least 70% of its particles −325 mesh. Additional water, colloidal silica and a dispersant, such as an aqueous solution of a polyelectrolyte, are added to the sialon powder in amounts needed to achieve a slip consistency. The amount of dispersant should be about 5% of the mix. To apply the slip, fired fused silica shapes are cleaned with compressed air to dislodge particles in the surface pores. The shapes are then presoaked in water for one to two minutes before application of the slip. The slip may be applied by brushing, dipping, or electrostatic spraying. The coated shapes are air dried for 12 hours, dried at 250° F. for at least 12 hours, and then heat treated to 1800° F. for five hours to provide adhesion. Utilizing this procedures a crack-free dense coating is produced.

Slips of sialon powder may be made with vehicles other than water, dispersant and colloidal silica. The vehicle selected must hold the powder in suspension during application and be able to provide a binding effect during drying and during exposure to high temperature.

Sialon coatings may also be applied to unfired fused silica ware. Since sialon is stable at temperatures used to fire used silica, application of the coating to green ware would save an extra manufacturing step.

In addition, materials other than fused silica which have thermal expansions similar to sialon, silicon carbide for instance, coated with sialon and should be considered equivalent.

In a preferred embodiment of the invention, the sialon powder should comprise about 70 to 90% of the coating with the colloidal silica ranging between about 0 and 6%. 2.5% is a useful figure.

It is intended that the foregoing description be construed as illustrative and not in limitation of the invention.

The embodiments of the invention in which an exclusive property or privilege is claimed are defined as follows:

1. Fused silica shapes having a coating of sialon on its surfaces.
2. Shapes of claim 1, in which there is about 2 to 10%, by weight, colloidal silica in the sialon coating.
3. Shapes of claim 1, in which the coating contains, in addition, a dispersant.
4. Shapes of claim 3, in which the dispersant is an aqueous solution of a polyelectrolyte.
5. Shapes of claim 1, in which the sialon content in the coating ranges between about 70 and 90%, by weight.
6. Shapes of claim 1, in which the colloidal silica comprises at least about 2%, by weight, of the coating.

* * * * *